INVENTORS
Kenneth D. Johnson
Elvin L. Carlson
Attorney

United States Patent Office 3,404,686
Patented Oct. 8, 1968

3,404,686
CORN SAVER MECHANISM FOR CORNHUSKERS
Kenneth D. Johnson, East Moline, and Elvin L. Carlson, Moline, Ill., assignors to International Harvester Company, Chicago, Ill., a corporation of Delaware
Filed Nov. 24, 1965, Ser. No. 509,508
3 Claims. (Cl. 130—5)

ABSTRACT OF THE DISCLOSURE

An apparatus for separating kernels of corn from an aggregate containing kernels and husk, collecting the kernels and disposing of the husk. The apparatus includes an upwardly inclined conveyor portion having an upper and a lower course. The upper inclined course promotes tumbling and thus better separation and the lower inclined course provides an opportunity for the husk to escape from the conveyor.

---

The present invention relates to corn husking. Particularly, the invention relates to a corn saver mechanism adapted for use with a corn husking device.

Although not intended as being so limited, the device herein disclosed is primarily useful with conventional corn harvesters of the class which normally comprise a mobile frame provided with means at the forward end for detaching or snapping ears of corn from standing stalks. Such detached ears, in husk covered condition, are normally fed rearwardly in the frame to a crop treating unit, for example, a husking unit. A husking unit comprises a cornhusker mechanism coventionally characterized by one or more pairs of co-operating husking or husk removing rolls which operate to grasp husks from husk covered ears of corn and to drive such husks downwardly beneath the rolls on or into a mechanism which carries the removed husks from the husking unit and ejects them from the harvester.

The ears from which husks have been removed remain on top of the husk removing rolls and are carried to a wagon elevator. The elevator conveys the husked ears out of the harvester into the collector or wagon which in ordinary practice follows the harvester.

The force to which the ears are subjected during husking causes kernels to be shelled or separated from their cobs. Such shelled or separated kernels become entrapped in the husks which are to be ejected from the harvester as waste. Because such entrapped grain has economic value, it is desirable to remove or recover the same provided that such removal can be done economically. For that purpose, shelled corn savers previously have been devised which, for example, agitate husks for the purpose of liberating therein or thereby entrapped grain. While such prior devices are considered effective for the purpose intended, they are relatively expensive when considered in the light of the present disclosure which obviates the requirement for agitators or paddles and their separate drives which comprise prior corn saver mechanisms.

The conventional means by which removed husks are ejected from a husking unit comprises a conveyor movable across a grate which is disposed below the husking rolls. Such grate is adapted to catch husks and free entrapped shelled kernels and to pass the kernels therethrough for removal from the harvester in one direction while the husks are carried by the conveyor for ejection in an opposite direction. The conveyor employed in the ejection of the husks is conventionally endless, the husks tending to drop from one end thereof. However, because of the elongated fibrous nature of the husks they do not always have sufficient time to fall away from the husk ejection ends of conventionally designed husk ejector conveyors and such husks may be backfed with recovered grain thereby giving rise to thereto attendant problems.

It is a principal object of the present invention to provide an improved corn saver adapted for use with a corn husker for recovery of shelled corn separated from ears thereof during husking and held by removed husks.

It is an additional object of the present invention to provide in a corn saver mechanism of the class described means for tumbling husks and shaking therein trapped shelled corn free therefrom.

It is another object of the present invention to provide a corn saver mechanism comprising husk disposal means disposed below a corn husking bed from which husks are gravity fed, said husk disposal means having grain passing means through which shelled kernels will fall and against which husks will collect a conveyor for sweeping husks from said grain passing means, said last means having an offset angular portion defining the path of conveyor whereby husks are tumbled to liberate therein held shelled kernels.

It is a further object of the present invention to provide a corn saver mechanism having a shelled corn passing bed on which husks are deposited for ejection from a husking mechanism and an endless conveyor with an upper flight disposed for sweeping husks from said corn passing bed and characterized by means adapted to preclude backfeed of husks being ejected.

The foregoing and other objects, features and advantages of the present invention will become more apparent upon consideration of the following description and appended claims, when considered in conjunction with the accompaying drawings wherein the same reference character or numeral refers to like or corresponding parts throughout the several views.

Figure 1:
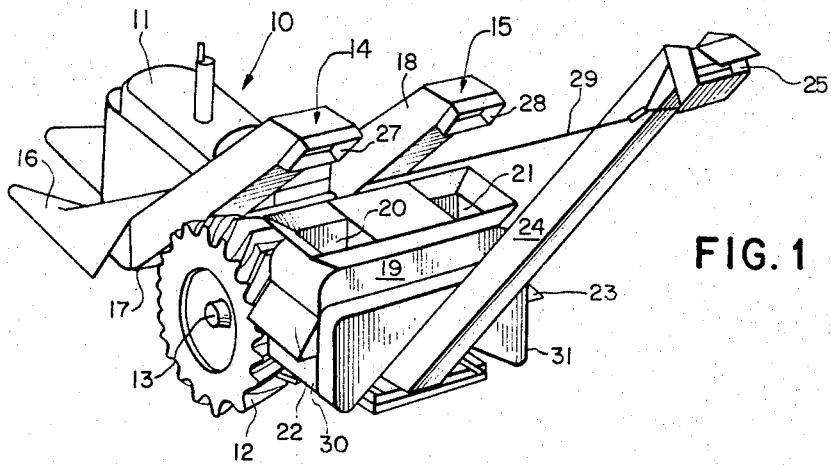
FIG. 1 is a rear perspective view of a tractor having mounted thereon a corn harvesting assembly.

Referring now more particularly to the drawings, there is shown in FIG. 1 a corn harvester assembly which includes a tractor generally designated by the numeral 10. The tractor has an elongated body 11 which is carried on a pair of large rear traction wheels 12, only one of which is shown in the drawings and a pair of front supporting wheels (not shown). The wheels 12 are mounted in a conventional manner on opposite end portions of an axle assembly 13 which is operably connected, by means which may be conventional, to the drive transmission mechanism (not shown) of the tractor 10. The harvester assembly comprises a pair of downwardly and forwardly extended harvester row units 14 and 15 which are disposed on opposite sides of the tractor body 11 between the respective left and right wheels of said tractor body. Each row unit includes a gathering and picking or severing mechanism which is contained in housing 16, only one of which is seen in the drawing, said picking or severing mechanisms adapted for aggressively detaching or snapping ears of corn from their stalks.

Row units 14 and 15 also include "first" elevators (not seen) which are disposed within respective elevator housings 17 and 18. Elevator housings 17 and 18 provide respective top openings 27 and 28 at their upper discharge ends from which snapped ears of corn 81 are discharged. The discharged ears of corn fall into a casing 19 which houses a husking means, to be hereinafter described, through respective housing openings 20 and 21 which are disposed in receiving alignment with the openings 27 and 28 respectively.

Additionally, the casing 19 has a pair of husk-ejection slots or openings 68 at opposite sides thereof through which husks removed from the ears of corn are ejected from the housing 19. Said husk ejection slots or openings are obscured in FIG. 1 of the drawings by thereabove disposed hoods 22 and 23. However, one of said husk ejection openings is in evidence in FIG. 2.

A wagon elevator housing 24 extends upwardly and rearwardly from the tractor 10. It is connected to body 11 by any means which may be conventional. Said elevator housing 24 encases a wagon elevator 26, only a portion of which is seen in the drawings in FIG. 2. The elevator 26 may be of any conventional construction well known in the art for movement of husked ears 82 upwardly to a discharge end or opening 25 from which such ears of corn spill into a wagon (not shown) which may trail the tractor 10. As illustrated in FIG. 1, a suitable guy 29 extends from the elevator casing 24 to the body 11, said guy providing the means for holding the elevator housing 24 at selected angular dispositions for selective direction of discharge end or opening 25.

The heretofore particular identified elements and components have been described in a rather general manner as they comprise conventional or already known structures the details of construction of which are not considered critical to the present invention and are not intended as limiting thereon.

Figure 2:
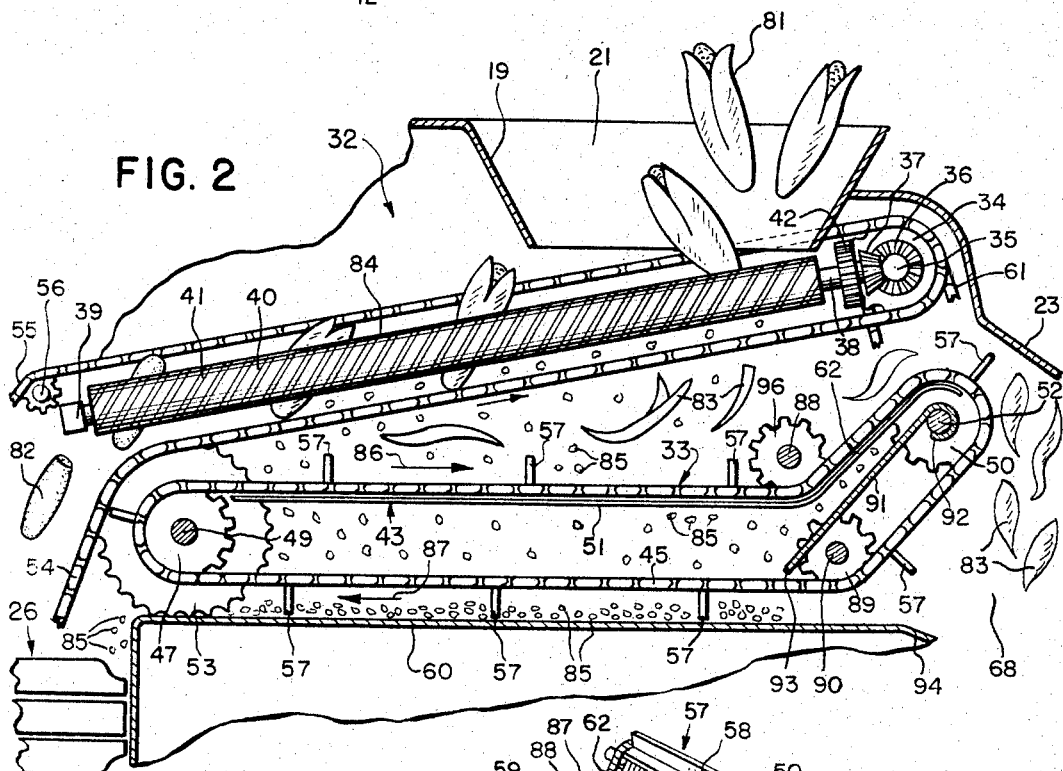
FIG. 2 is a rear elevational view of a corn husking unit and associated corn saver mechanism embodying the present invention, having parts of the chain drive for the husking unit and corn saver mechanism broken away.
Figure 3:
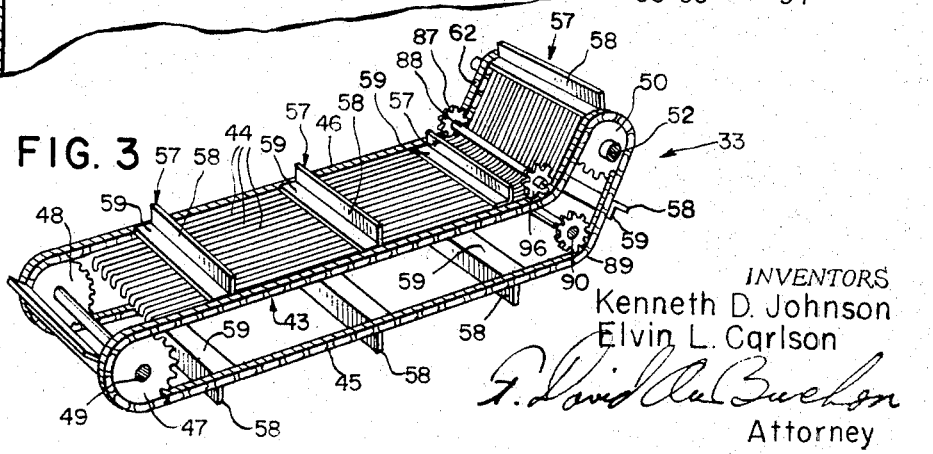
FIG. 3 is a rear perspective view of the corn saver mechanism.

Referring once again to the drawings, it is observed that the wagon elevator 26, heretofore identified as being enclosed within the casing 24, is disposed substantially midway between the sides 30 and 31 of the husking means casing 19. A husking means comprising a husking mechanism, generally designated in FIG. 2 by the numeral 32, and an associated shelled corn saver mechanism, generally designated in FIG. 2 by the numeral 33, are disposed on each side of the wagon elevator 26, each of the husking mechanisms 32 being disposed in ear receiving alignment with an associated one of the openings 20 and 21. In FIGS. 2 and 3 of the drawings, only the husking mechanism 32 and the shelled corn saver mechanism 33 disposed to the right side of the elevator 26 when viewed from the rear of the tractor 10 are disclosed, as the details of construction of the opposite mechanism (not shown) are substantially the same as those seen in the drawings.

Attention is now invited to FIG. 2 which discloses in part a sprocket or link chain 61 comprising a plurality of connected together links which may be operably connected to the prime mover of the tractor 10 in any suitable or conventional fashion well known to those in the art. The sprocket chain 61 drives a sprocket wheel which is obscured in the drawings and which is mounted on a shaft 35 in any suitable manner and constrained for rotation therewith whereby said shaft is rotated with said sprocket chain 61. The shaft 35 also has rigidly secured thereon by suitable means a second sprocket wheel 34 for which said shaft 35 provides a fixed axis of rotation. Also secured on the shaft 35 and constrained for rotation therewith is a bevel gear 36. Said bevel gear 36 meshes with the bevel gear 37 which is rigidly secured on an outer end portion of a shaft 38 with which the gear 37 is constrained for rotation. Shaft 38 is suitably journalled, by any conventional means, such as in a journalling block 39 aptly supported in a fixed position within the casing 19. Accordingly, the shaft 38 is rotated by reason of a driving force transmitted through sprocket chain 61.

The longitudinal axis of the shaft 38 is disposed substantially at right angles or normal to the longitudinal axis of the shaft 35. However, said shaft 38 is angularly disposed within the husking mechanism casing 19 so that it slopes downwardly as it extends toward the center of the casing, as illustrated in FIG. 2.

The shaft 38 has rigidly secured thereon and carries longitudinally thereof a roll 40 which may be of hard rubber fabrication. The roll 40 is provided with a spiral flute or groove 41 which extends longitudinally of said roll. Husking roll means comprising at least one other roll parallel to roll 40 and mounted on an adjacent shaft which is obscured in FIG. 2 operates in conjunction with the roll 40 in a conventional manner to provide a husk stripper or husking bed 84. Bed 84 has an upper and lateral end portion disposed beneath opening 21 and from which lateral end portion the lower end portion slopes centrally into delivery alignment with elevator 26. By reason of the stripping action which occurs between roll 40 and adjacent husking roll means (not shown), the husking operation occurs. To the end that the unseen adjacent husking roll means is driven, a spur gear 42 is rigidly secured on the shaft 38. Said spur gear 42 operably meshes with an adjacent gear (not shown) which is operably connected to drive the associated shaft mechanism of such unseen adjacent husking roll means.

As the snapped ears of corn 81 fall from the openings 27 and 28 into the respective openings 20 and 21 of the casing 19, they drop onto their respective husking beds 84 on which aggressive husk stripping action occurs by reason of the aforestated bed construction. At the time the husks 83 (only some of which have been numbered in the drawings) are removed from the ears of corn 81, the force of the husk stripping action causes unintentional or undesired shelling of corn from said ears.

The husks 83 which are stripped from the ears 81 together with the unintentionally shelled kernels 85 are pulled between and below the rolls comprising husking bed 84 and drop therefrom onto a corn saver bed which is generally designated 43 and characterizes the shelled corn saver mechanism 33.

The husked ears 82, on the other hand, are carried by gravity downwardly across the top of the husking bed 84 by reason of the inclination thereof. When the husked ears 82 reach the central end of the husking bed 84, they fall therefrom onto the wagon elevator 26 by which they are conveyed through housing 24 for removal from the harvesting device.

The corn saver bed 43 is disposed beneath the bed 84 and is of adequate planar dimensions to insure that all removed husks 83 will be deposited thereon. The bed 43 is a grain sieve designed for selective passage of shelled corn. In the instant embodiment bed 43 is shown as a grain separating grid which may comprise a plurality of rigid relatively fixed rods 44 or the like, only some of which are numbered in FIG. 3. As shown in the illustrated embodiment, the rods 44 extend laterally from the elevator 26 or longitudinally of the longitudinal axis of the husking mechanism 32. However, the disposition of said rods is not critical and the same may extend transversely of the longitudinal axis of the husking mechanism 32 if desired. It is important however that the physical components comprising the bed 43 be spaced apart a sufficient distance to form a plurality of apertures, holes, spaces or the like to provide ports or passages through said bed 43 of dimensions adequate to permit selective passage therethrough of loose corn kernels 85 while barring husks 83.

A husk conveyor, which coacts with additional components that will hereinafter be described and which also partially define the corn saver mechanism 33, comprises a pair of endless conveyor sprocket chains 45 and 46. Said chains 45 and 46 are shown fabricated from conventional drivable links and disposed on opposite sides of the grid or bed 43 as illustrated in FIG. 3. The conveyor chains 45 and 46 in the embodiment disclosed in the instant drawings are rotated clockwise with respect to FIG. 2, that is in the direction of arrows identified by numerals 86 and 87 in FIG. 2, each of said chains defining a pair of vertically spaced apart courses. The top courses of said conveyor chains move to the right with respect to FIG. 2, that is in the direction of arrows designated 86; while the bottom courses move to the left with the respect to FIG. 2, that is in the direction of the arrows designated 87.

A pair of sprocket wheels 47 and 48 which are spaced transversely of the bed or grid 43 support and guide the chains 45 and 46 at their central end portions, as illustrated in FIGS. 2 and 3. Said sprocket wheels 47 and 48 are mounted on a shaft 49 with which said sprocket wheels are constrained for rotation and for which said shaft 49 provides a fixed axis of rotation. The shaft 49 is journalled in any suitable fashion well-known in the art within the casing 19. At the other end thereof, the conveyor chains 45 and 46 are supported by sprocket wheels 50, only one of which is seen in the drawings, said sprocket wheels 50 being spaced apart transversely of the bed or grid 43 in a manner which is evident by having reference to FIG. 3. The sprocket wheels 50 are rotatable clockwise with respect to FIGS. 2 and 3 about a fixed axis of rotation provided by a shaft 52 which is suitably jourjournalled in any conventional manner within the housing 19.

The sprocket wheels 50 are driven respectively by the endless conveyor chains 45 and 46, which in turn are driven by the sprocket wheels 47 and 48. To motivate the sprocket wheels 47 and 48 drive sprocket wheels 53 may be rigidly secured or suitably mounted on the shaft 49 in a manner which constrains said drive sprocket wheel 53 for rotation with said last mentioned shaft. The drive sprocket wheel 53 is engaged and driven by a link or sprocket chain 54 which transmits the torque of the hereinbefore defined sprocket wheel 34, as illustrated in FIG. 2.

Although the sprocket chain 54 is shown broken, the links thereof are preferably connected together in an endless fashion whereby said chain 54 may drive an unseen sprocket wheel the torque of which may be transmitted through proper mechanical linkage to drive companion corn husking and corn saver components which ordinarily would be disposed to the left of the elevator 26 shown in FIG. 2. An idler sprocket 55 which is seen to the left of FIG. 2 serves to direct the upper course of the sprocket chain 54 downwardly as it extends centrally. Said idler is rotatable about a fixed axis of rotation provided by a stub shaft 56 which is suitably supported in any conventional fashion within the housing 19.

The opposite end portions of a plurality of elongated angular flights, members or slats 57 which extend transversely of said conveyor chains 45 and 46 are connected thereto. Said flights 57 are disposed from each other in spaced apart relationship longitudinally of the path of movement of the conveyor chains 45 and 46. Each flight 57 comprises two portions. The first portion is an outwardly extending boss 58 (only some of which are numbered in FIG. 3) which extends substantially perpendicular to the plane of the path of said chains 45 and 46. The second portion 59 extending at right angles to said boss 58 is disposed substantially in the plane of the path of movement of the conveyor comprised of the chain 45 and 46.

The flights 57 when passing through or across the upper course of the conveyor comprised of the chains 45 and 46 sweep the husks 83 from the surface of the grid or bed 43 downstream, i.e., to the right with respect to FIG. 2, into the husk ejection opening 68 for elimination from the husking mechanism housing 19.

A table or flat 60 which is provided in a fixed position within the housing 19 is disposed below the lower course of the conveyor provided by the chains 45 and 46. The spacing of the table from the lower course of the husk conveyor is such that the bosses 58 will just about reach the flat 60, whereby shelled kernels 85 which have fallen through the grid or bed 43 will be swept to the left with respect to FIG. 2 by the bosses 58. From the end of the table or flat 60, the kernels 85 of shelled corn will fall onto the wagon elevator 26 which will remove them from the housing 19 together with the husked ears of corn 82.

As illustrated in FIGS. 2 and 3, the grid or bed 43 has a substantially horizontal or center portion 51 and an angularly upwardly extending or offset lateral or outer section 62 the outer end of which is disposed adjacent and in delivery association with the husk ejection slot 68. The conveyor chains 45 and 46 are caused to curve to conform to the shape of the grid or bed 43 thereby to carry the flights 57 across the horizontal and the offset or angular surface of the grid or bed 43 for the purpose aforestated. As illustrated in FIG. 2, the angularly offset section 62 of the grid or bed 43 is disposed beneath the lateral or outer end portion of the husking bed 84.

To cause the upper course of the conveyor comprising the chain 45 and 46 to bend to conform to the slope of grid section 62, a pair of chain guides in the form of idler sprocket wheels 96 and 97 are provided. The sprocket wheels 96 and 97 are carried in opposed positions on a shaft 88 which is suitably mounted in the housing 19 and disposed medially of the ends of the husk conveyor, said sprocket wheels 96 and 97 respectively engaging chains 45 and 46 from above the upper course of the conveyor but below the level of the sprocket wheels 50, whereby the course of the chains 45 and 46 can be bent angularly upwardly, as illustrated in FIGS. 2 and 3. To cause a corresponding bending in the lower course of said conveyor chains 45 and 46, a pair of chain guides comprising idler sprocket wheels 89, only one of which is seen in the drawings, are employed. The sprocket wheels 89 are carried in opposite positions on a shaft 90 which is suitably mounted within the housing 19. The sprocket wheels 89, respectively, operably engage the upper surfaces of the lower course of the chains 45 and 46 which are bent upwardly about said last mentioned sprocket wheels. As illustrated, the sprocket wheels 89 are disposed below the sprocket wheels 96 and 97 as well as the sprocket wheels 50.

While the grid or bed 43 is adapted to pass the shelled corn kernels 85, which are dropped from the bed 84, many of the kernels are trapped by the husks 83 and thereby held above the bed or grid 43. As the husks move laterally toward slot 68, they are carried angularly upwardly following the contour or incline of grid section 62. The slope of section 62 is such that a fraction of the husks 83 will tumble over bosses 58 under the force of gravity as they are swept up the incline thereby providing sufficient agitation to liberate shelled corn trapped in such tumbled husks to permit passage through the grid or bed 43. It is observed that the angular disposition of the grid section 62 is such that a fraction of the husk will make the incline under the sweeping action of flights 57 and drop from said conveyor through the opening 68. However, it is also observed that by varying the angle or slope of conveyor section 62 fractions of the husks to be tumbled and to be discharged can be varied.

Now, the outermost or ejection end portion of the husk ejection conveyor extends laterally beyond the table or flat 60 so that husks 83 which fall from the end of the husk conveyor will clear said table or flat. To maximize shelled corn recovery the grid or bed 43 extends to the discharge end of the husk conveyor. To minimize loss of grain which falls through the grid end section 62 a baffle, guide or deflector plate 91 is mounted in angular disposition between the upper and lower courses of the conveyor chains 45 and 46. The deflector plate may be disposed substantially parallel to the offset grid section 62 and have an upper end portion 92 anchored on the shaft 52 by thereabout bent means and a lower end portion 93 disposed adjacent the upper surface of the table or flat 60. Because the opening 68 is defined by a lateral extension 94 of table or flat 60, the deflector plate end portion 93 should be disposed sufficiently inwardly of the lateral edge of said table or flat to preclude any loss of grain through the opening 68.

Not only does the angular disposition or upward offset of the lateral end portion of the corn saver mechanism 33 provide improved means for recovery of trapped shelled corn removed from the ears during the husking operation but it also provides the means whereby a cleaner end product is procured. That is to say, because the discharge end of the conveyor comprising the grain saver mechanism 33 is elevated from the table or flat 60 in the manner shown, greater time is permitted for the husks 83 to fall from the discharge end of said conveyor than that which is available in conventional lineally disposed husk conveyors. This feature is significant because the physical characteristics of the husks are such that they tend to be dragged by the husk conveyor from the top of the lower course. Employing the instant construction more time is allowed for the husks 83 to fall away from the husk conveyor, the likelihood of being pulled onto flat or table 60 thereby being minimized and cleaner grain insured.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A grain corn saver mechanism of the type operable with and positioned adjacent a husking assembly, said corn saver mechanism comprising an elongated grid, having a generally horizontal portion and an inclined portion, said inclined portion being formed at one end of said elongated grid; a flat table located beneath said generally horizontal portion of the elongated grid; a continuous conveyor having upper and lower courses for conveying material in a first direction along said elongated grid toward and up the inclined portion, and also for conveying material in a direction opposite to said first direction along said flat table, an inclined deflector plate located below the inclined portion of said grid and above the lower course of said continuous conveyor, said inclined deflector plate terminating in a lower edge overlying said flat table, said continuous conveyor including a pair of sprockets rotatably mounted adjacent each end of said elongated grid, the sprockets in each pair being spaced apart such that said elongated grid is located therebetween and located with respect to said elongated grid such that their upper peripheral edges extend slightly above the plane of said elongated grid, a pair of upper idlers mounted adjacent the intersection of the horizontal and inclined portions of said elongated grid, a pair of lower idlers mounted below said upper idlers and over said flat table, a pair of endless chains connected by a plurality of slats mounted on said sprockets and engaged by said idlers such that said upper course of said continuous conveyor is located above said elongated grid and said lower course is located above said flat table.

2. A corn saver mechanism of the type operable with and positioned under a husking assembly from which husks removed from ears of corn fall downwardly as an aggregate together with corn unintentionally shelled during husking, said corn saver mechanism comprising a grain passing bed including a substantially horizontal portion disposed in aggregate receiving relationship with said husking assembly and having a husk discharge end portion extending angularly upwardly from said substantially horizontal portion, a first conveyor means operable to move husk along the surface of said grain passing bed and said husk discharge end portion, a shelled corn receiving means disposed below said substantially horizontal portion of the grain passing bed, a clean grain collection station adjacent said shelled corn receiving means, a second conveyor means for moving grain deposited on said shelled corn receiving means towards said clean grain collection station and a grain slide disposed beneath said husk discharge end portion and having a lower end portion in delivery association with said shelled corn receiving means whereby shelled corn passed by said husk discharge end portion will be gravity fed towards said shelled corn receiving means.

3. A corn saving mechanism as defined in claim 2 in which the conveyor means are characterized by an endless conveyor having upper and lower courses, the upper course constituting said first conveyor disposed in husk sweeping relationship with said grain passing bed and the lower course constituting said second conveyor and operable to sweep shelled corn toward said clean grain collection station.

References Cited

UNITED STATES PATENTS

| | | | |
|---|---|---|---|
| 1,771,027 | 7/1930 | Bradley et al. | 130—5 |
| 2,836,952 | 6/1958 | Hume | 56—192 |
| 2,950,720 | 8/1960 | Sheard | 130—21 |
| 3,245,413 | 4/1966 | Essex | 130—5 |

ANTONIO F. GUIDA, *Primary Examiner.*